United States Patent
Heintjes

(10) Patent No.: US 9,242,719 B2
(45) Date of Patent: Jan. 26, 2016

(54) WING OF AN AIRCRAFT OR SPACECRAFT, COMPRISING A MOBILE FLOW BODY

(75) Inventor: Mark Heintjes, Weyhe (DE)

(73) Assignee: AIRBUS OPERATIONS GmbH, Hamburg (DE)

( * ) Notice: Subject to any disclaimer, the term of this patent is extended or adjusted under 35 U.S.C. 154(b) by 492 days.

(21) Appl. No.: 13/258,603

(22) PCT Filed: Mar. 31, 2010

(86) PCT No.: PCT/EP2010/054338
§ 371 (c)(1),
(2), (4) Date: Nov. 29, 2011

(87) PCT Pub. No.: WO2010/115815
PCT Pub. Date: Oct. 14, 2010

(65) Prior Publication Data
US 2012/0119036 A1    May 17, 2012

Related U.S. Application Data

(60) Provisional application No. 61/166,859, filed on Apr. 6, 2009.

(30) Foreign Application Priority Data

Apr. 6, 2009  (DE) .................. 10 2009 002 222

(51) Int. Cl.
*B64C 3/00*    (2006.01)
*B64C 9/16*    (2006.01)

(52) U.S. Cl.
CPC ... *B64C 9/16* (2013.01); *Y02T 50/44* (2013.01)

(58) Field of Classification Search
CPC ............. B64C 9/02; B64C 9/16; B64C 9/04; B64C 9/06; B64C 9/00; B64C 21/02; Y02T 50/166
USPC ........... 244/213, 214, 217, 130, 76 A, 123.1, 244/99.3, 102 R, 198; 29/897.2
See application file for complete search history.

(56) References Cited

U.S. PATENT DOCUMENTS 2,246,116 A * 6/1941 Wagner et al. ................ 244/216
2,284,519 A * 5/1942 Hall .............................. 244/216
(Continued)

FOREIGN PATENT DOCUMENTS

DE        1756515      5/1968
DE    10 2008 020 654    11/2009
(Continued)

OTHER PUBLICATIONS

Russian Decision for Granting, Jul. 18, 2013.
Office Action issued by the German Patent Office for DE 10 2009 002 222.8, mailed Feb. 9, 2012.

*Primary Examiner* — Tien Dinh
*Assistant Examiner* — Assres H Woldemaryam
(74) *Attorney, Agent, or Firm* — Greer Burns & Crain, Ltd.

(57) ABSTRACT

A wing of an aircraft or spacecraft, the wing including at least a movable flow body, the wing including a movable support member, which is connected to the flow body, for rotating the flow body on the wing, the wing including a flow body control element, the flow body control element being fixed to the wing in a first point and the support member in a second point, the two points of the flow body control element and of the support member forming an axis, the flow body control element being formed at a predetermined angle to the axis and the flow body control element guiding the flow body in a predetermined plane about this axis.

20 Claims, 10 Drawing Sheets

(56) References Cited

U.S. PATENT DOCUMENTS

| | | | | |
|---|---|---|---|---|
| 2,524,605 | A | * | 10/1950 | Servanty .................. 244/216 |
| 4,470,569 | A | | 9/1984 | Shaffer et al. |
| 4,498,647 | A | * | 2/1985 | Boehringer et al. ......... 244/99.3 |
| 4,614,320 | A | * | 9/1986 | Rutan ...................... 244/216 |
| 4,784,355 | A | * | 11/1988 | Brine ....................... 244/213 |
| 6,394,397 | B1 | * | 5/2002 | Ngo et al. ................. 244/199.3 |
| 8,408,499 | B2 | * | 4/2013 | Cerne ....................... 244/213 |
| 2002/0047068 | A1 | * | 4/2002 | Uchida et al. ............. 244/75 R |
| 2007/0034748 | A1 | | 2/2007 | Sakurai et al. |
| 2010/0116928 | A1 | * | 5/2010 | Cerne ........................ 244/87 |

FOREIGN PATENT DOCUMENTS

| | | | |
|---|---|---|---|
| RU | 1816713 | | 5/1993 |
| RU | 1272628 | | 12/2004 |
| RU | 71625 | | 3/2008 |
| WO | WO 2008/129074 | | 10/2008 |
| WO | WO 2008/129074 | * | 11/2008 ............... B64C 9/16 |
| WO | 2009/130025 | | 10/2009 |

\* cited by examiner (A)

(A-A)

(B-B)

(A-A)

(B-B)

WING OF AN AIRCRAFT OR SPACECRAFT, COMPRISING A MOBILE FLOW BODY

CROSS-REFERENCE TO RELATED APPLICATIONS

This application claims the benefit of U.S. Provisional Application No. 61/166,859, filed Apr. 6, 2009 and German Patent Application No. 10 2009 002 222.8, filed Apr. 6, 2009, the entire disclosures of which are herein incorporated by reference.

FIELD OF THE INVENTION

The present invention relates to a wing of an aircraft or of a spacecraft comprising a movable flow body, for example a flap or a landing flap.

The wings of an aircraft normally comprise a plurality of landing flaps. These landing flaps are extended or pivoted outwards for example during landing, in order to produce a suitable resistance to brake the aircraft. A landing flap normally rotates about an axis of rotation, the landing flap being able to move only perpendicularly to the axis of rotation. Furthermore, the landing flaps are also used in particular to produce a stronger lift during take-off.

Furthermore, an aircraft wing comprising landing flaps is known from US 2007/0034748 A1. In this case, a support is provided. A first portion of the support is rigidly and immovably connected to the aircraft wing. A second portion of the support is connected to a structural component of the landing flap via a first connecting element. The second portion of the support is further connected to a drive device via a second connecting element. In this case, the connection of the support to the first and second connecting elements forms a rigid axis of rotation HA (hinge line HA). The connection or the connection point of the first connecting element to the structural component of the landing flap further forms a first compensating means. The connection or the connection point of the second connecting element to the structural component of the landing flap further forms the second compensating means. The connection or connection point of the second portion of the support to the first and second connecting elements forms the third compensating means. The compensating means make it possible for the landing flap to rotate simultaneously about the rigid axis of rotation HA and another, non-parallel axis.

US 2007/0034748 A1 has the drawback that operation of the respective landing flap is complex and expensive, since a complicated construction is required for this purpose, consisting of the support which is rigidly mounted on the wing, the first and second connecting elements and the compensating means.

SUMMARY OF THE INVENTION

The object of the present invention is therefore to provide an improved wing comprising a movable flow body, for example a landing flap.

According to the invention, this object is achieved by a wing comprising a movable flow body having the following features.

A first aspect of the present invention relates to the provision of a wing of an aircraft or spacecraft,
the wing comprising at least a flow body,
the wing comprising a movable support means or support member, which is connected to the flow body, for rotating the flow body on the wing about a virtual axis,
the wing comprising a flow body control means or flow body control element,
the flow body control means being arranged at an angle to the support means and forming an axis with the support means,
the flow body control means guiding the flow body or a part of the flow body in a predetermined plane about this axis.

In this case, the wing has the advantage of having a simple construction for guiding or conveying the flow body in a predetermined plane about an axis, in such a way that the flow body can be extended for example in the flow direction. For this purpose the wing according to the invention comprises a flow body control means which is arranged at an angle to the support means of the wing. The flow body control means supports the flow body and the support means laterally and absorbs lateral forces of the wing. A further advantage is, as described above, that a part or a point of the flow body can be guided by the flow body control means in a predetermined plane, as a result of which the flow body as a whole can be rotated on a virtual axis in such a way that said flow body can be pivoted or extended for example in the flow direction of the aircraft. As a result, no gap or only a small gap in relation to an adjacent aircraft wing or another adjacent flow body can further be provided, for example, and the aerodynamic resistance thus reduced.

Advantageous embodiments and developments of the invention are provided in the dependent claims and in the description with reference to the drawings.

In an embodiment of the invention, the support means is fixed in a bearing point on the wing and in at least one or two bearing points on the flow body. Owing to the fixing of the support means to the flow body in two bearing points, the stability of the connection of these two parts can be increased further.

According to a further embodiment according to the invention, the flow body control means is fixed in a bearing point on the wing and in at least one bearing point on the flow body. As a result, a particularly cost-effective fixing of the flow body means can be achieved, since only one bearing point has to be provided on the flow body and the wing respectively.

In an embodiment of the invention, the flow body control means is positioned relative to the support means in such a way that said flow body control means absorbs forces of the support means in a predetermined direction. For example, the flow body control means can be positioned or inclined relative to the support means in such a way that the flow body means absorbs lateral and axial forces of the support means. This has the advantage that an axial movement of the flow body can be prevented and as a result a gap between the flow body and an adjacent flow body can at least be reduced or can even be omitted entirely.

In another embodiment according to the invention, the support means is formed as a frame element or a plate or comprises one or more rod elements. In this case, the support means forms, for example, a bow shape or a triangular shape. The planar shape of a bow or a triangle has the advantage that the support means has greater stability.

According to a further embodiment according to the invention, the bearing point of the flow body control means on the flow body and the bearing point of the support means on the flow body form a common bearing point. This has the advantage that only one bearing point is required for connecting the flow body control means and the support means to the flow body. Alternatively, the two bearing points can also each be formed as separate or distinct bearing points.

In a further embodiment according to the invention, the wing comprises at least two fixing portions. In this case, each fixing portion comprises a corresponding support means. Furthermore, a fixing portion is additionally provided with the flow body control means, in order to guide the flow body in a predetermined plane.

According to another embodiment according to the invention, one, a plurality or all of the bearing points of the support means and/or the flow body control means are formed as spherical bearings. A spherical bearing has the advantage that is makes a plurality of movement directions possible.

In a further embodiment according to the invention, the flow body control means comprises at least a control rod element. The control rod element has the advantage that it is simple and cost-effective to produce.

According to a further embodiment of the invention, the movable flow body is, for example, a landing flap. It is particularly important for the landing flap to carry out a predetermined movement, in order for example not to collide with an adjacent landing flap or a part of the wing.

BRIEF DESCRIPTION OF THE DRAWINGS

In the following, the invention will be described in greater detail on the basis of embodiments with reference to the accompanying figures, in which.

DESCRIPTION OF EXEMPLARY EMBODIMENTS

Figure 1:
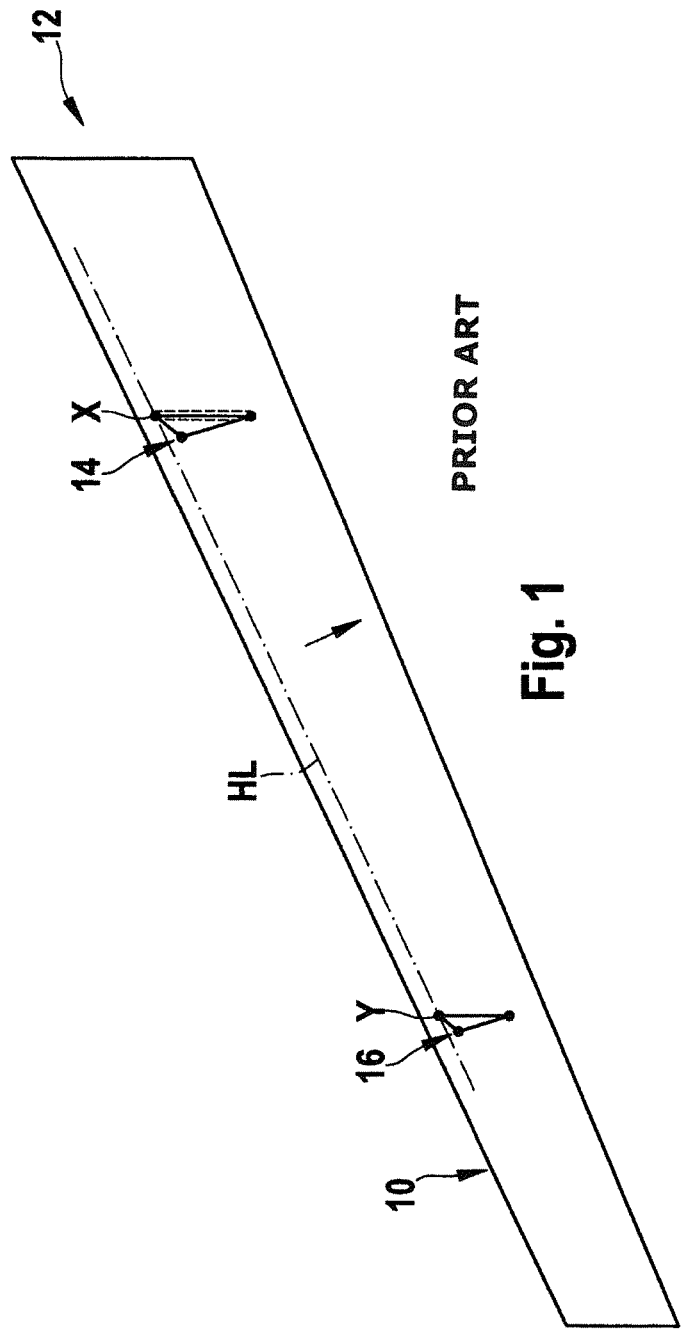
FIG. 1 is a view of a known flow body of an aircraft wing.

FIG. 1 is firstly a highly simplified and purely schematic view of a known movable flow body 10 of an aircraft wing 12.

Figure 6:
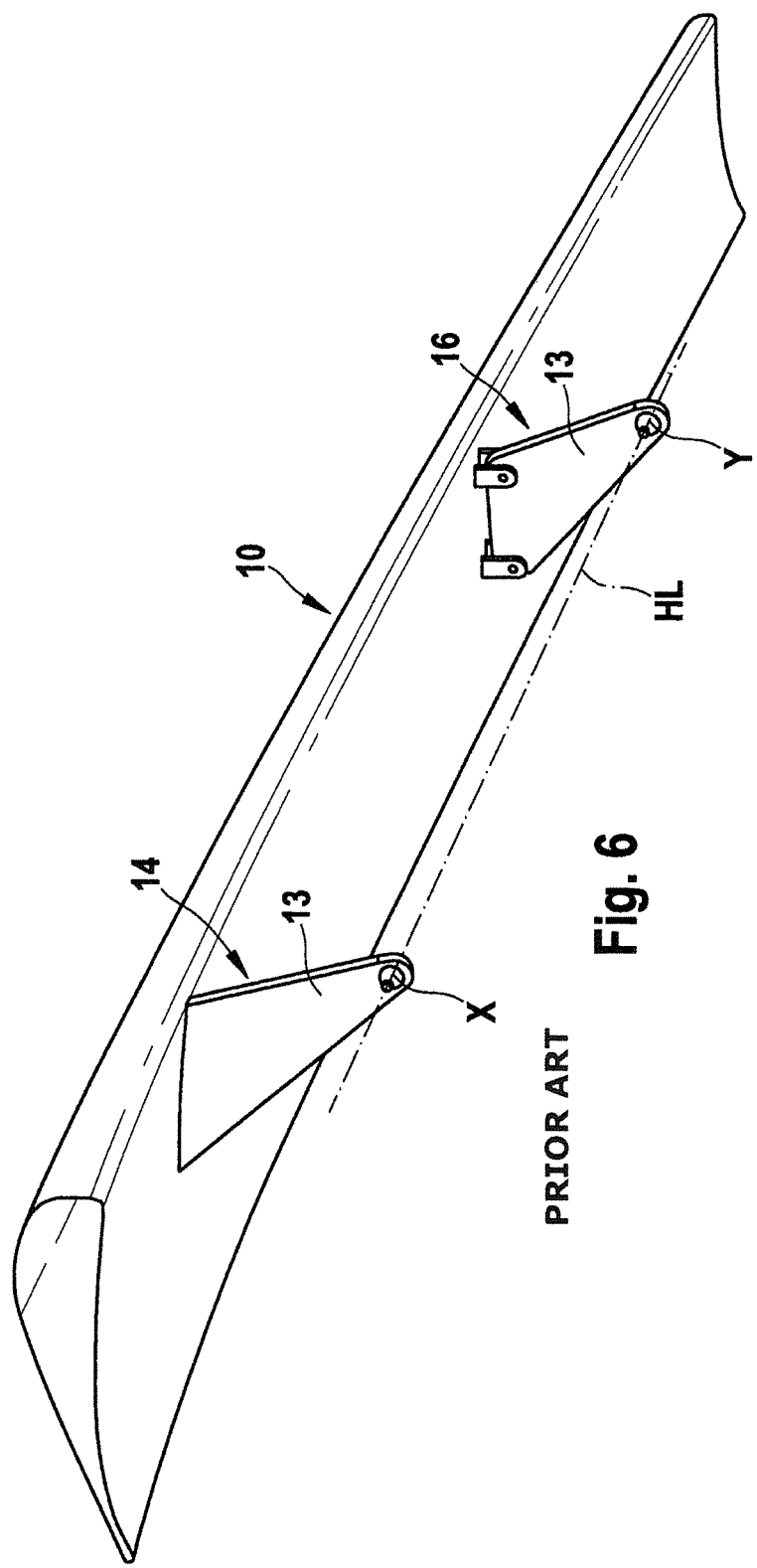
FIG. 6 is a perspective view of a known landing flap.

In this case, the movable flow body 10 is a landing flap. The flow body 10 comprises for example two first and second fixing portions 14, 16 and support means (so-called flap supports), at which the flow body 10 is connected to the aircraft wing 12. In this case, the first fixing portion 14 forms, for example, the so-called master support, which absorbs a side load. The second fixing portion 16 in turn forms, for example, the so-called movable support. In FIG. 6 which follows, the flow body 10 comprising the two fixing portions 14 and 16 is shown again in a perspective view. In this case, the two support means 14, 16 are each fixed in a respective point X and Y on the aircraft wing (not shown) and each form a respective point of rotation X and Y for the flow body 10, the two points of rotation X and Y forming an axis of rotation HL, about which the flow body 10 can pivot. The first point of rotation Y on the second fixing portion 16 has two degrees of freedom, while the second point of rotation X on the first fixing portion 14 has only one degree of freedom. In this case, by having only one degree of freedom, the second point of rotation X prevents the flow body 10 from moving longitudinally relative to the axis of rotation HL. This is to ensure that the flow body 10 as a whole can only pivot about the axis of rotation HL and no lateral movement of the flow body 10 is possible.

In the case of the flow body 10, for example a landing flap, shown in FIG. 1, the known flow body 10 moves about the axis of rotation HL, the flow body 10 being able to rotate only about this axis of rotation HL, however. The movement direction is predetermined, as indicated by an arrow in FIG. 1.

Figure 2:
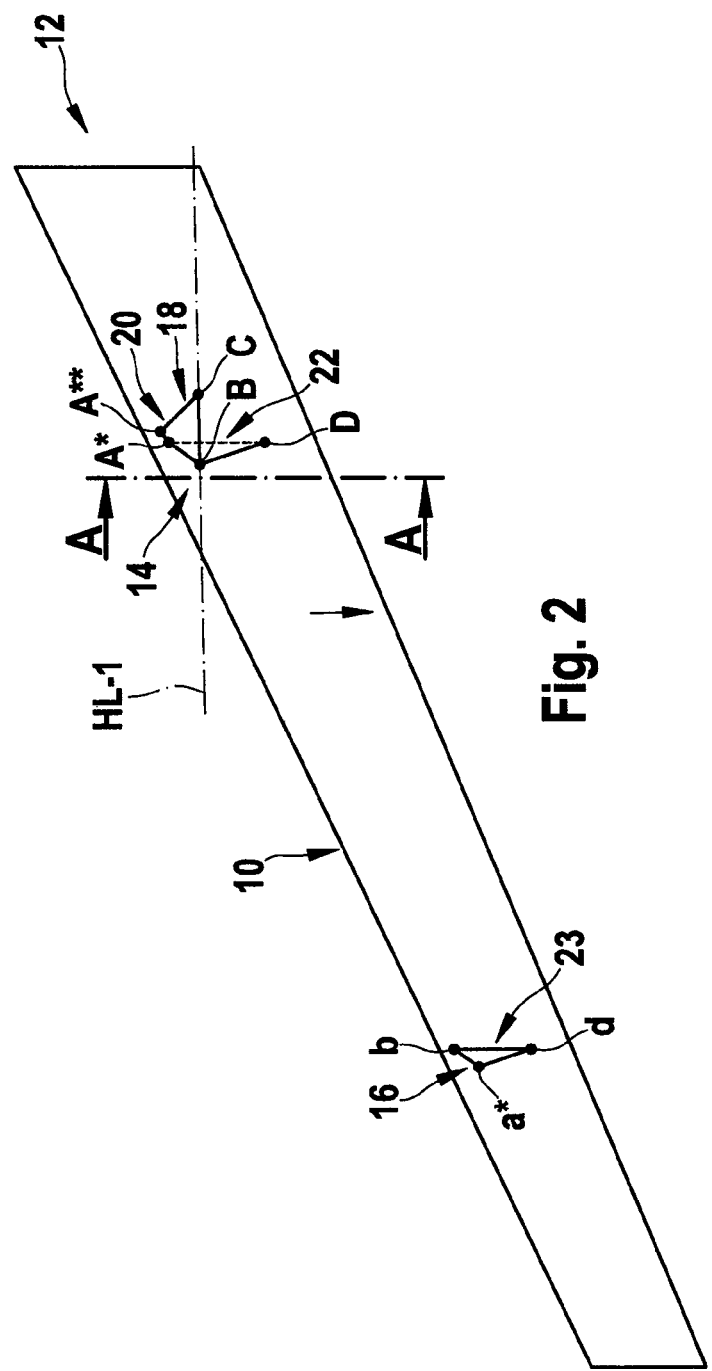
FIG. 2 is a view of a flow body of an aircraft wing according to the invention.

In FIG. 2, however, which shows the flow body 10 according to the invention, the flow body 10 can describe a movement direction other than that of FIG. 1, which is advantageous in particular for aircraft landing flaps on a backswept aircraft wing. An example of a backswept aircraft wing is shown for example in FIG. 3 or 4 which follow. In this case, the movable flow body 10, for example a landing flap, preferably describes a movement in the flow direction, as indicated in FIG. 2 by an arrow. The movement direction can be predetermined as desired within certain limits by way of another arrangement of the axis HL-1 which is formed by the points C and B.

FIG. 2 is a highly simplified and purely schematic view of a movable flow body 10 of an aircraft wing 12 according to the invention. In this case, the flow body 10 is, for example, a flap or a flap element, for example a landing flap.

The flow body 10 also comprises at least two first and second fixing portions 14, 16 and movable support means or support members 22, 23 (so-called movable flap supports), at which the flow body 10 is connected to the aircraft wing 12. However, only one fixing portion is formed in the form of the first fixing portion 14, as described in further detail below. It is also possible to provide more than two fixing portions for fixing the flow body 10 to the aircraft wing 12 and in this case, as described above, one fixing portion is formed as a first fixing portion 14 and the remaining fixing portions are, for example, provided in the form of the second fixing portion 16.

The first fixing portion 14 can be arranged "inboard" on the aircraft wing or "outboard" on the aircraft wing. The same applies for the second fixing portion 16 and optionally additional further second fixing portions 16. This respective second fixing portion 16 can accordingly be arranged "outboard" on the aircraft wing or "inboard" on the aircraft wing. This applies to all embodiments of the invention.

The support means 23 on the second fixing portion 16 is fixed in the points a* and d on the flow body 10 and in the point b on the aircraft wing (not shown). The support means 22 on the first fixing portion 14 is further fixed in the points A* and D on the flow body 10 and in the point B on the aircraft wing (not shown). A flow body control means or flow body control element 18 is also provided, which for example comprises or forms a control rod element 20. The control rod element 20 is fixed in a point C on the aircraft wing and, together with the point B of the support means 22, forms an axis of rotation HL-1, about which the support means 22 can rotate. In this case, a point of the flow body 10 is moved in a plane which is predetermined by the control rod element 20 or in a circle about the axis of rotation HL-1. The plane or the circle forms, for example, a normal or vertical to the axis HL-1.

The control rod element 20 is further fixed to the point A** on the flow body 10. In other words, the two support means 22 and 23 of the fixing portions 14 and 16 each form a point of rotation for the flow body 10. The landing flap 10 is guided laterally by the flow body control means 18 and the flow body 10 therefore rotates about a virtual axis (not shown). In addition to the rotation about the point b, the support means 23 on the second fixing portion 16 can also make a tilting movement, in this case for example in the span direction of the landing flap 10, such that the flow body 10 or a point of the flow body 10 can be moved in the predetermined plane about the axis HL-1.

In order to achieve a movement of the flow body 10 in the predetermined plane and prevent a movement of the flow body 10 axially to the axis of rotation or a lateral movement, according to the invention at least a flow body control means 18 or in this case a control rod element 20 is provided. This flow body control means is connected to the flow body 10 in such a way that the flow body control means 18 can be rotated only in a predetermined plane about the corresponding axis HL-1 (see also FIG. 9 which follows in this regard), and a lateral or axial movement of the flow body 10 is additionally prevented. The flow body 10 does not rotate as a whole about the axis HL-1, but rather about a virtual axis. Only a so-called point of the flow body 10 moves in the predetermined plane about the axis HL-1 or is guided in a predetermined plane or a circle about the axis HL-1 by the control rod element 20.

The control rod element 20 serves to prevent the lateral movement of the flow body 10. The control rod element 20 further absorbs the side load of the flow body 10 and dissipates said side load into the rigid wing structure of the aircraft wing 12. The flow body 10 describes a movement for example in the flight direction (streamwise motion) or in another desired direction, depending on the arrangement of the flow body control means 18 and the control rod element 20. The advantage of this system is that the flow body 10 requires only small additional gaps, or no gaps, at the ends thereof, which gaps would otherwise produce an aerodynamic resistance in flight. The omission of the gaps further means that the components thus far required for this purpose can be dispensed with and weight and costs can be saved as a result.

This control rod element 20 is shown in a highly simplified and purely schematic manner in FIG. 2. In FIG. 2, the control rod element 20 ensures that the bearing point or point of rotation of the first fixing portion 14, and thus the flow body 10, can move only in a predetermined plane.

The flow body control means 18 has the advantage that the flow body 10 can be moved in a defined plane or about a virtual axis. In this way the flow body 10 can be prevented from colliding for example with the aircraft wing 12 or an adjacent flow body owing to a lateral movement of the flow body 10. The occurrence of a larger gap between the flow body and for example an adjacent flow body or the aircraft wing 12 is also prevented. As a result, the aerodynamic behaviour of the entire wing 12 can be improved and the fuel consumption reduced.

Figure 3:
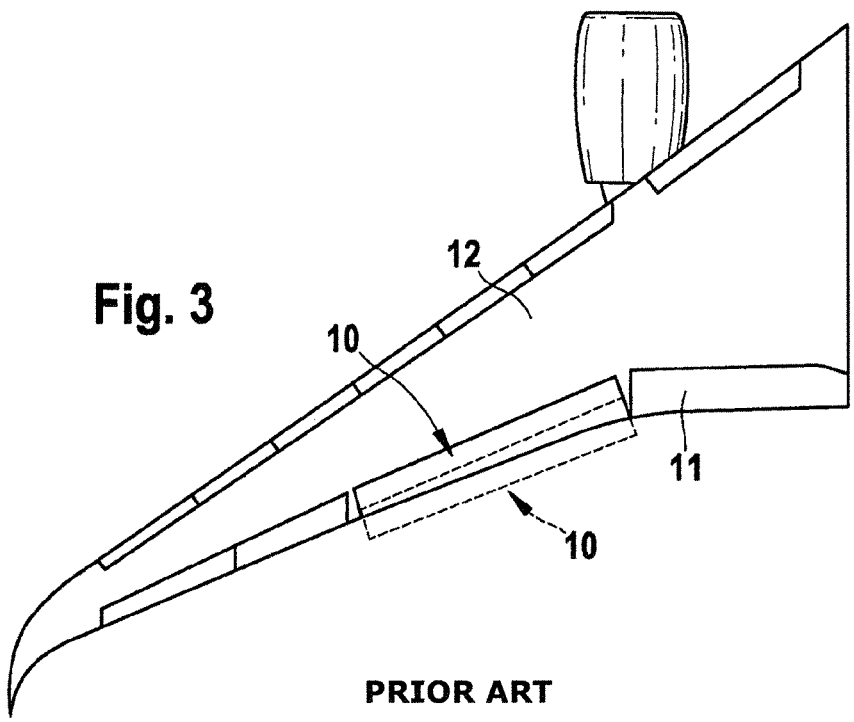
FIG. 3 shows a known aircraft wing comprising a landing flap as a flow body in an initial position and in an opened-out position.

FIG. 3 shows an aircraft wing 12 comprising a known landing flap 10 as a flow body 10. The landing flap 10 is shown in an initial position by a continuous line and in an opened-out or extended position by a dashed line. As described above with reference to FIG. 1, the flow body 10 can move only about the rigid axis of rotation thereof. However, this has the drawback, as indicated in FIG. 3, that in an opened-out or extended position the landing flap 10 can unintentionally get in the way of the adjacent landing flap 11, in the worst case the two landing flaps 10, 11 contacting one another and possibly becoming damaged. Therefore, a sufficiently large gap is normally provided between adjacent landing flaps 10, 11, which gap prevents unintentional mutual contact between the landing flaps 10, 11.

Figure 4:
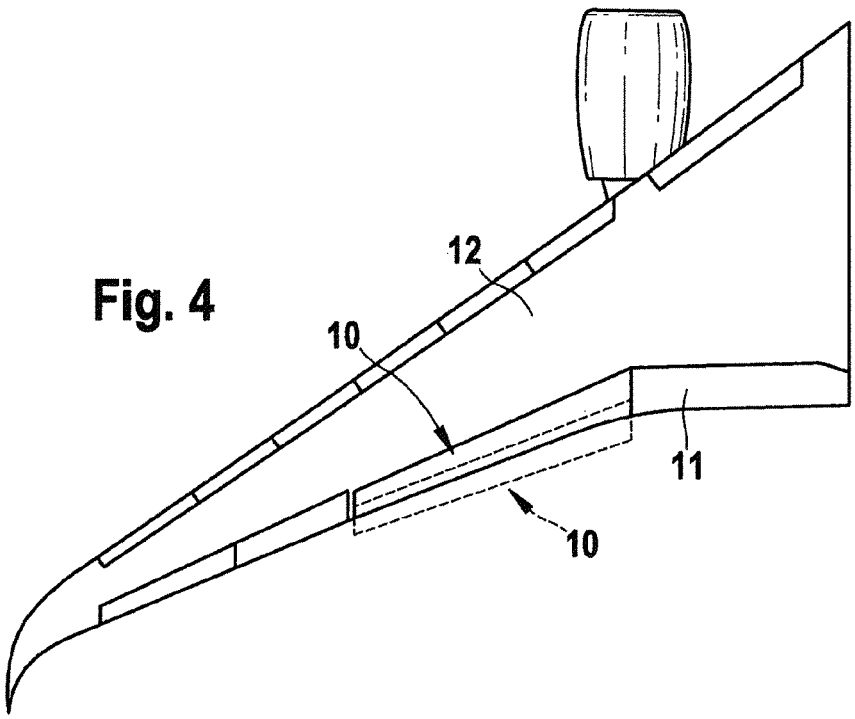
FIG. 4 shows an aircraft wing comprising a landing flap as a flow body in an initial position and in an opened-out position according to the invention.

FIG. 4 shows an aircraft wing 12 comprising a landing flap 10 as a flow body 10 according to the invention. In this case, the landing flap 10 is also shown in an initial position by a continuous line and in an opened-out or extended position by a dashed line. As described above with reference to FIG. 2, when extended the landing flap 10 according to the invention describes for example a movement in the flow direction. As a result, the landing flap is prevented from getting in the way of the adjacent landing flap 11 shown in FIG. 4. Furthermore, a gap between the two landing flaps 10, 11 can be omitted or said gap can be reduced in comparison to the known solution in FIG. 3.

Figure 5A:
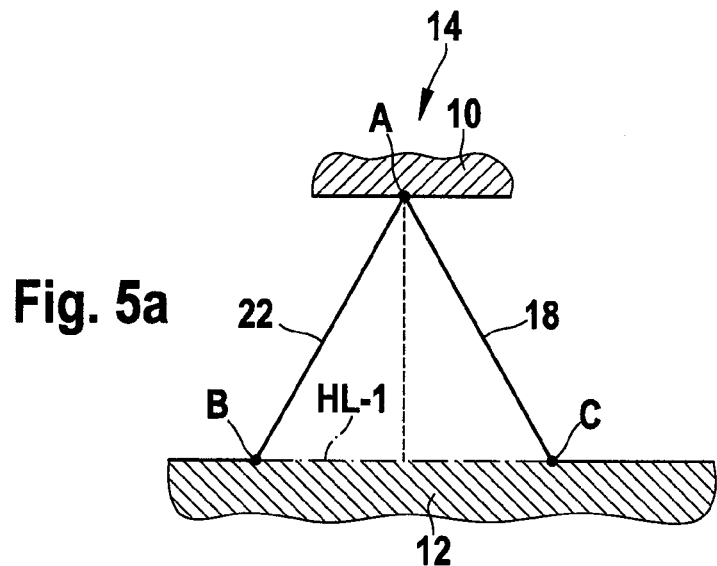
FIG. 5a is a schematic view of a support means and a control rod element according to an embodiment of the invention.
Figure 5B:
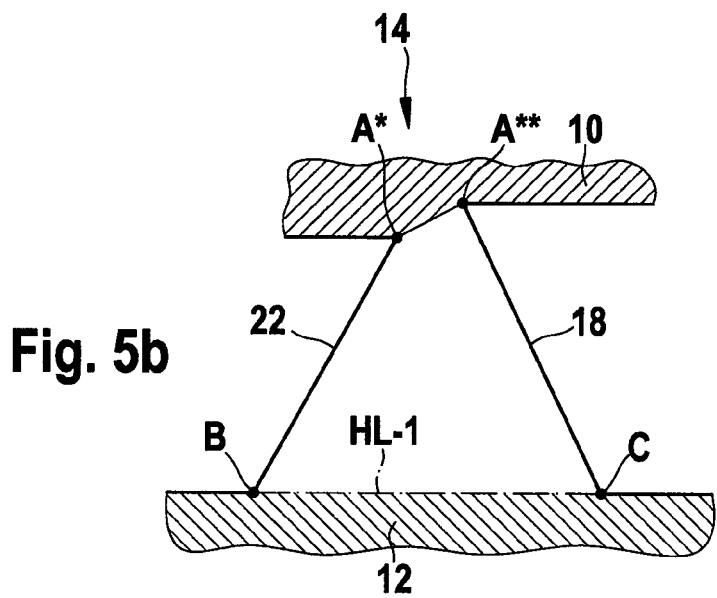
FIG. 5b is a schematic view of a support means and a control rod element according to a further embodiment of the invention.

FIGS. 5a and 5b show the principle according the invention in a highly simplified and purely schematic manner. FIGS. 5a and 5b both show the first fixing portion 14 comprising the support means 22.

As described above, FIG. 5a shows the support means 22 of the first fixing portion 14, which support means actuates or moves the flow body 10. The support means 22 is connected at a first end to the flow body 10 and forms a bearing point A. The support means 22 is further connected at a second end to the aircraft wing 12 and forms a bearing point B. The support means 22 forms at its second end with the bearing point B a point of rotation, about which it pivots or rotates the flow body 10. In order to ensure a movement of the support means 22 and thus of the flow body 10 in a predetermined plane, according to the invention the flow body control means 18 is provided. The flow body control means 18 can for example be provided in the form of, or comprise, a control rod element 20. This control rod element 20 forms with the support means 22 a type of triangle or in other words the control rod element 20 supports the support means 22 laterally and axially or in other words in the lateral direction.

The control rod element 20 is fixed at its first, upper end with the upper or first end of the support means 22 for example to the common point A on the flow body 10. The control rod element 20 is further fixed at its lower, second end to the aircraft wing 12 and forms a bearing point C. The two lower bearing points B and C of the support means 22 and of the control rod element 20 form a common axis HL-1, about which the flow body 10 is pivoted, namely in the plane in which the common point A is located. In other words, the point A of the flow body 10 moves in a circle about the axis HL-1, the circle or the plane which forms the circle being located perpendicular to the axis HL-1.

As shown in FIG. 5b, the control rod element 20 can alternatively be fixed with its upper, first end to a first point A** of the flow body 10 and the upper, first end of the support means 22 can be fixed separately therefrom to a second point A* on the flow body 10.

The support means 22 and the control rod element 20 are fixed at the two lower or second ends thereof to the aircraft wing 12 and also form a respective bearing point or point of rotation B, C. The two lower bearing points B and C of the support means 22 and of the control rod element 20 form the common axis of rotation HL-1, about which the flow body control means 18 can be rotated. The control rod element 20 further ensures that the control means 22, or the upper, first end thereof which forms the bearing point A* with the flow body 10, and thus the flow body 10, can be pivoted only in a predetermined plane. The flow body 10 is pivoted about a virtual axis of rotation HL-1 and guided in a plane perpendicular to the axis HL-1.

FIG. 6 is a perspective view of a known landing flap, the fixing portions 14, 16 of the landing flap being shown in a highly simplified and purely schematic manner. The first fixing portion 14 (in this case the co-called master support) and the second fixing portion 16 (in this case the so-called slave support) of the landing flap for fixing to the aircraft wing are shown. The first fixing portion 14 comprises an attachment 13 which is rigidly connected at one end to the landing flap 10 and at the other end is rotatably connected to the aircraft wing (not shown) and forms a point of rotation X therewith.

The second fixing portion 16 in turn comprises an attachment 13 which is rotatably fixed at one end thereof to two points on the landing flap and is rotatably fixed at the other end thereof to the aircraft wing (not shown) and forms a point of rotation Y therewith. The two points of rotation X and Y of the first and second fixing portions 14, 16 form an axis of rotation HL. In this case, the landing flap 10 has the drawback that it can only move perpendicularly to the axis of rotation HL thereof, as shown in FIGS. 1 and 3, since the first fixing portion 14 prevents a lateral movement.

Figure 7:
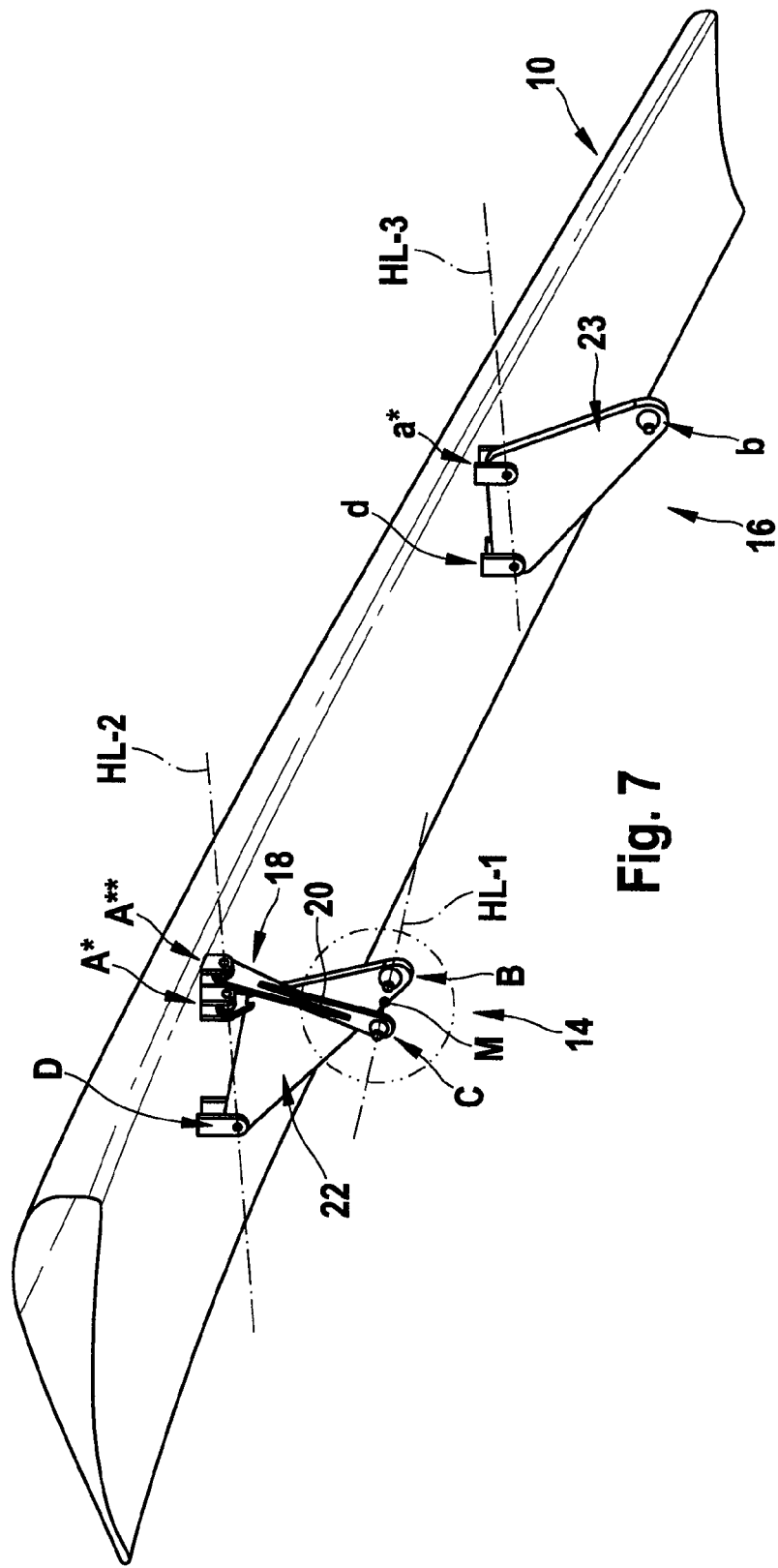
FIG. 7 is a perspective view of the flow body according to the invention.

FIG. 7 is a perspective view of the flow body 10 according to the invention, in the present case a landing flap 10, for example. The fixing portions 14, 16 of the landing flap 10 are shown in a highly simplified and purely schematic manner and not to scale. The example in FIG. 7 corresponds substantially to the principle shown in FIG. 5b. The first fixing portion 14 (in this case the so-called master support) and the second fixing portion 16 (in this case the so-called slave support) of the landing flap 10 for fixing to the aircraft wing (not shown) are shown.

The second fixing portion 16 comprises, as shown in FIG. 7, an attachment, in this case a support means 23, which at one end thereof is fixed or mounted at for example two points a* and d on the landing flap 10 and forms the bearing points a* and d. At the other end thereof, the support means 23 is further fixed or mounted in a point b on the aircraft wing (not shown) and forms therewith a bearing point or point of rotation b.

The first fixing portion 14 further comprises an attachment, in this case a support means 22, which is fixed or mounted at for example two points A* and D on the landing flap 10 and forms the bearing points A* and D. At the lower end thereof, the support means 22 is fixed or mounted at a point B on the aircraft wing (not shown) and forms therewith the bearing point or point of rotation B. According to the invention, an additional flow body control means 18, for example in the form of a control rod element 20, is provided on the first fixing portion 14. In the example in FIG. 7, the upper, first end of the control rod element 20 is fixed or mounted at a point A on the flow body 10 and forms therewith the bearing point A. The control rod element 20 is further fixed or mounted at the second, lower end thereof in a point C on the aircraft wing (not shown). The two lower bearing points C and B of the control rod element 20 and of the support means 22 of the first fixing portion 14 form a common axis HL-1, about which the flow body control means 18 can be rotated and the flow body 10 can be guided.

The bearing points A*, D and A of the support means 22 and of the control rod element 20 of the first fixing portion 14 can further be located on a common axis HL-2, as shown in FIG. 7. However, the bearing point A of the control rod element 20 need not be located on the axis HL-2 of the bearing points A* and D of the support means 22, but rather can also be provided in another position on the flow body 10. The bearing points a* and d of the support means 23 of the second fixing portion 16 further form a common axis HL-3.

The landing flap 10 according to the invention has the advantage that it can be moved in a defined direction or for example in the flow direction, as shown previously in FIGS. 2 and 4. In other words, the landing flap 10 is guided for example perpendicularly to the axis HL-1 because the flow body control means 18 can only rotate about this axis.

Figure 8:
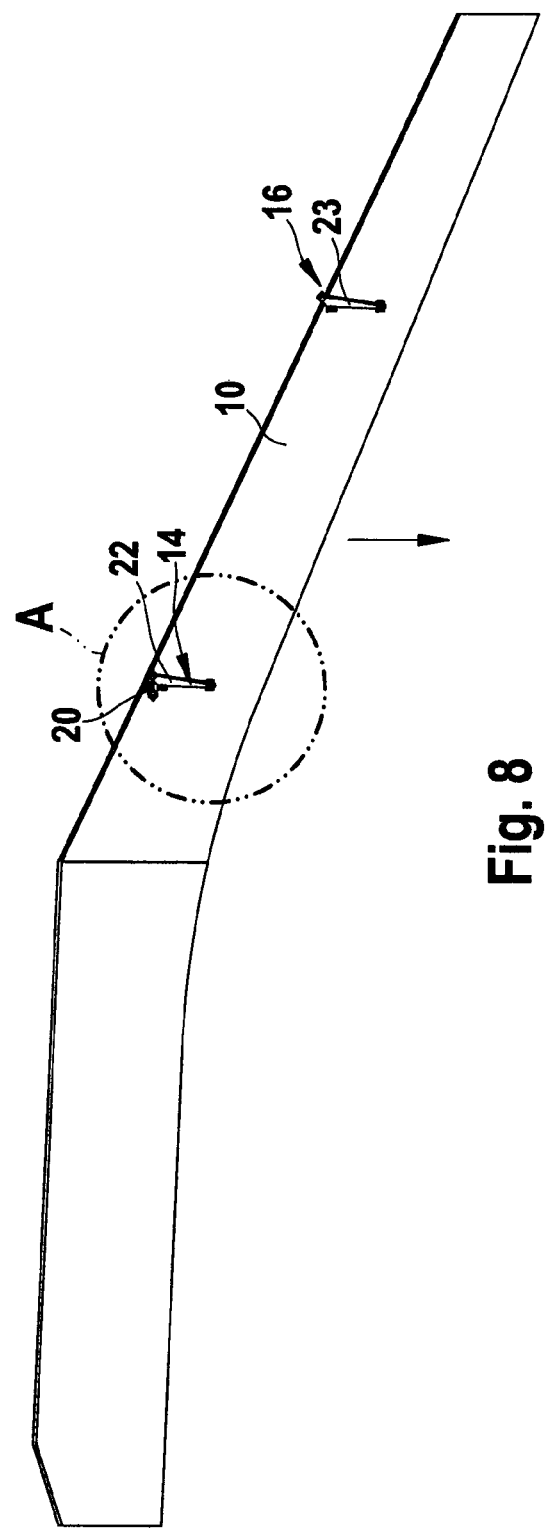
FIG. 8 shows a detail of the aircraft wing and the landing flap as a flow body according to the invention.

FIG. 8 further shows a detail of an aircraft wing and the landing flap as a flow body according to the invention. In this case, the second fixing portion 16 is shown with its support means 23 and the first fixing portion 14 is shown with its support means 22 and the additional control rod element 20.

Figure 9:
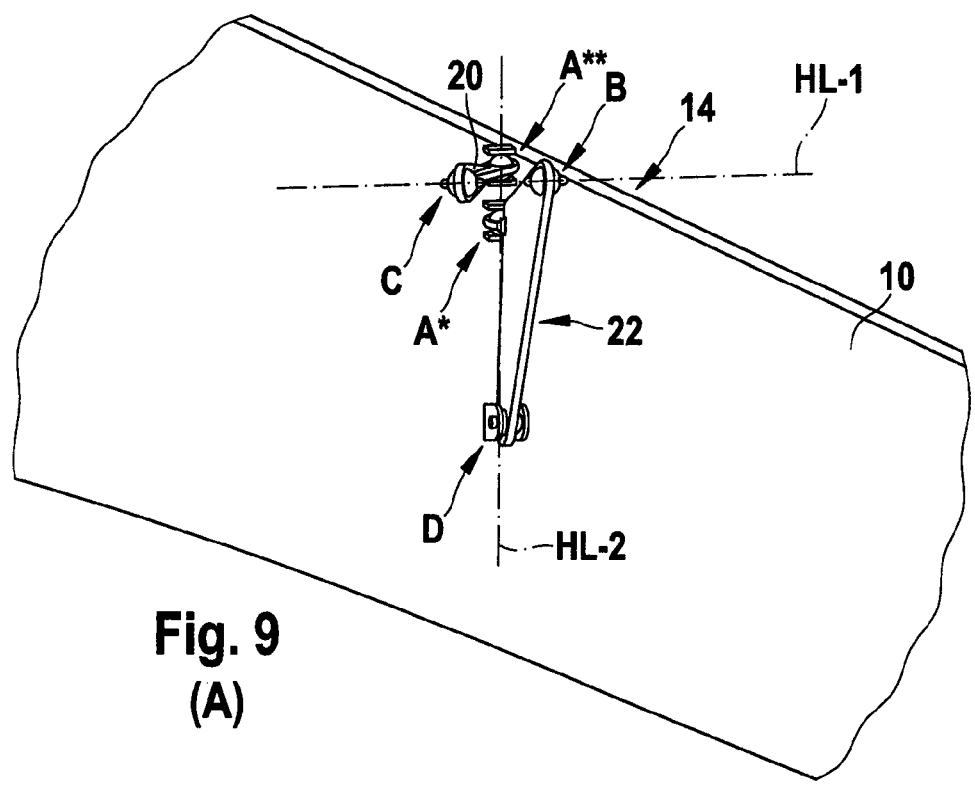
FIG. 9 shows a detail A of the upper fixing portion of the flow body according to the invention.

FIG. 9 further shows an enlarged detail A of the first fixing portion 14 of the flow body 10 according to the invention.

In this case, the support means 22 is fixed or mounted in the points A* and D on the flow body 10 or in this case the landing flap 10. One or both bearing points A* and D can be provided in the form of spherical bearings. The same also applies for the fixing of the support means 22 on the aircraft wing (not shown) in the point B. The bearing point B is preferably also formed as a spherical bearing. The control rod element 20 is fixed or mounted in the point A** on the flow body 10 and is located for example on the axis HL-2 which is formed by the bearing points A* and D of the support means 22. However, this is not absolutely necessary. The point A* of the support means 22 and the point A** of the control rod element 20 can also be joined or combined in a point, as shown previously by way of example in FIG. 5a.

The control rod element 20 is further fixed or mounted in the point C on the aircraft wing and forms the axis HL-1 with the bearing point B of the support means 22. The bearing points A** and C of the control rod element 20 can also be formed as spherical bearings.

Figure 10:
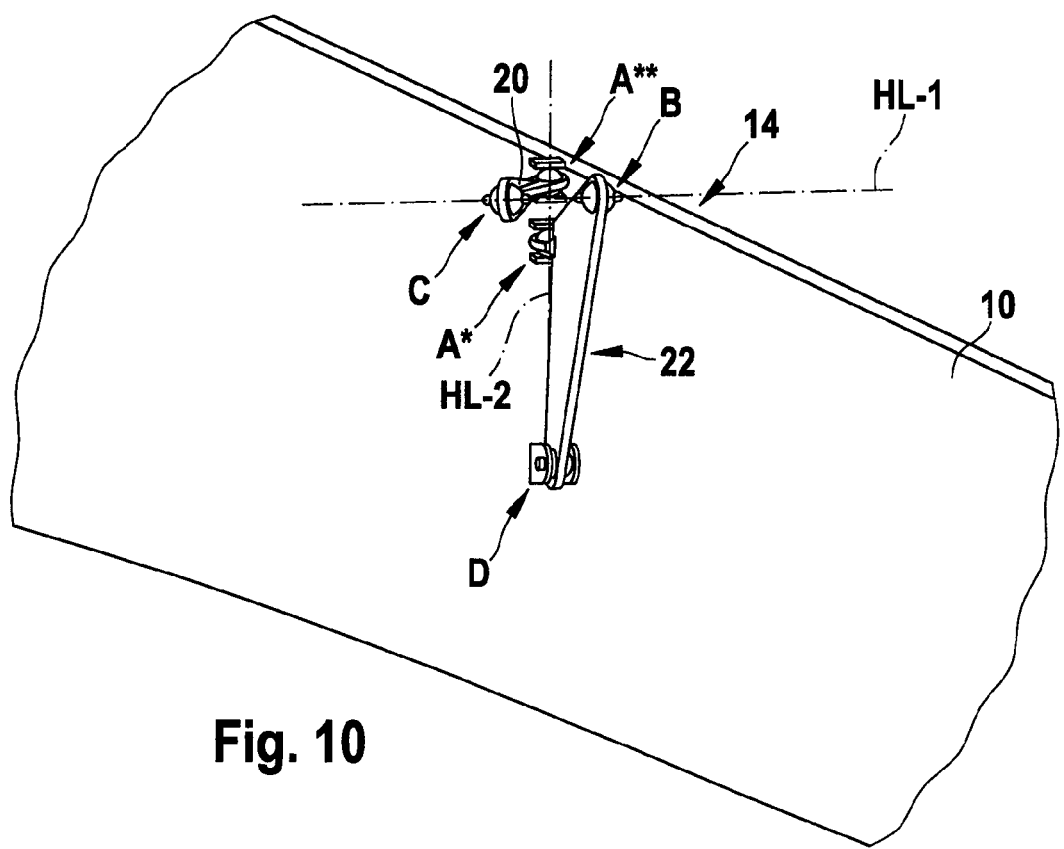
FIG. 10 shows a further detail of the upper fixing portion of the flow body according to the invention.

FIG. 10 shows a further detail of the first fixing portion 14 of the flow body 10 according to the invention. Therein the fixing or bearing points A* and D of the support means 22 on the flow body 10 and the fixing or bearing point A of the control rod element 20 on the flow body 10 are located for example on the common axis HL-2. As described above, it is also possible for the bearing point A of the control rod element 20 not to be located on the axis HL-2 which is formed by the bearing points A* and D of the support means 22. The fixing or bearing point B of the support means 22 and the fixing or bearing point C of the control rod element 20 form the axis HL-1. According to the invention, the flow body 10 or the landing flap 10 rotates about a virtual axis of rotation (so-called virtual hinge line) which is not shown. In the example shown, the so-called master plane is perpendicular to the axis HL-1 defined by means of the control rod element 20. The flow body 10 or the landing flap 10 is guided in this plane or master plane. In other words, a point of the flow body 10 moves in the plane or master plane about the axis HL-1. This means that this point is located in the master plane in which the flow body 10 is guided.

Figure 11:
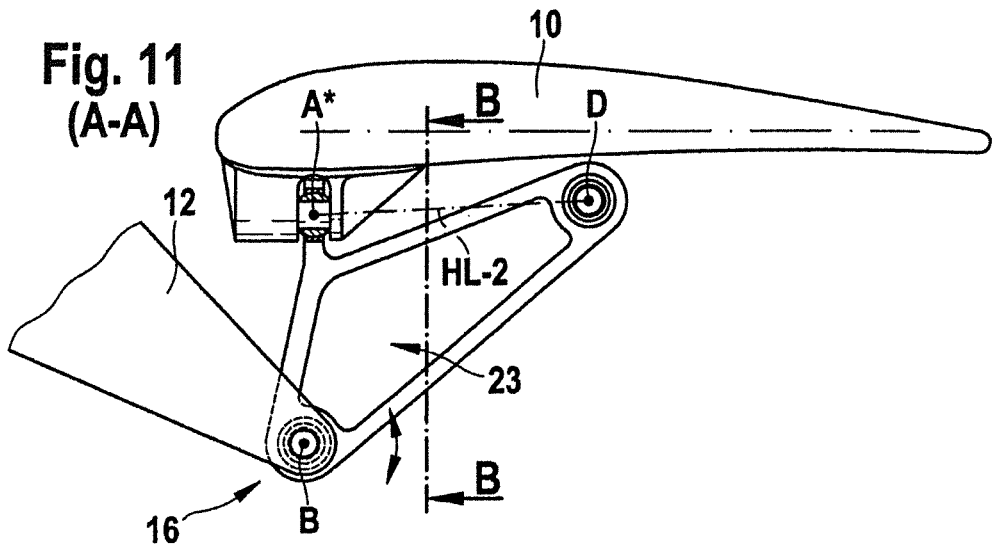
FIG. 11 is a sectional view A-A through the flow body in the lower fixing portion according to FIG. 2, with the flow body control means thereof.

FIG. 11 shows a further embodiment of the invention. FIG. 11 is a sectional view A-A at the second fixing portion 16

(FIG. 2) through the movable flow body 10 of the invention according to FIG. 2, and the support means 23 thereof. In this case, the support means 23 is not provided in the form of a solid plate, as shown in FIG. 7, but rather for example in the form of a frame. However, this is merely a further example of how the support means 23 can be formed. The invention is not limited to the embodiments of the support means 23 which are shown. The statements made with respect to the support means 23 of the second fixing portion 16 apply accordingly for the support means 22 of the first fixing portion 14 are will not be repeated.

As shown in FIG. 11, only the support means 23, and no flow body control means, is provided on the second fixing portion 16 on the flow body 10. The upper, first end of the support means 23 is fixed or mounted at a first point A* on the flow body 10 and forms the bearing point A*. The upper, second end of the support means 23 is further fixed at a second point D on the flow body 10 and forms the bearing point D. The two upper bearing points A* and D of the support means form the common axis HL-2.

The lower, second end of the support means 23 is further fixed or mounted on the aircraft wing 12 in a second point B on the aircraft wing 12. The flow body 10 can thereby rotate once on the second fixing portion 16 about the point B. If the point B or the bearing point B is formed as a spherical bearing, in principle the spherical bearing allows rotation in all three directions or about all three axes. However, the main direction of rotation is in the direction of the arrow, as indicated in FIG. 11, and in the axial direction (for example into the image plane or out of the image plane). For example, spherical bearings can also be provided as bearings for the bearing points A* and D. However, the invention is not limited to spherical bearings for the bearing points A*, B and D. Any other type of suitable bearings or mountings can be provided, it being possible for the bearing points A*, B and D each to have the same mounting or a different mounting. In FIG. 11, the support means 23 in the form of a frame has, for example, a bow shape or a triangular shape. This has the advantage that the support means 23 has particularly good stability. In principle, however, the support means 23 can for example also comprise only at least one support rod element (not shown) which forms the connection of the two bearing points A* and B. In this case, further support rod elements can also be provided in the support means 23, for example support rod elements which form the connection of the bearing points B and D, and A* and D, to mention just two examples. In this case, the statements made with respect to the support means 23 of the second fixing portion 16 also apply accordingly for the support means 22 of the first fixing portion 14 and will not be repeated.

Figure 12:
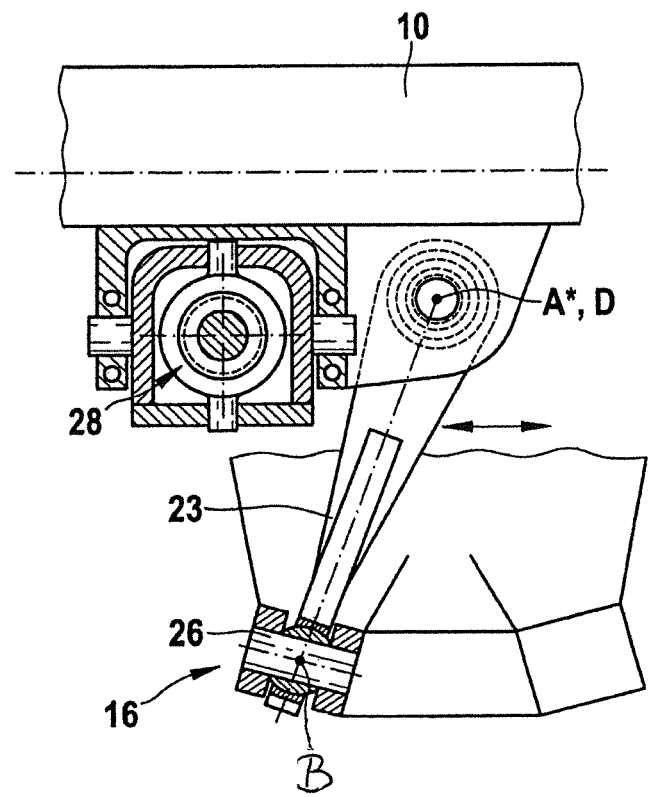
FIG. 12 is a sectional view B-B through the flow body in the lower fixing portion, with the support means thereof according to FIG. 11.

FIG. 12 further shows a sectional view B-B at the second fixing portion 16 (FIG. 2) through the movable flow body 10 according to the invention in FIG. 11 and the support means 22 thereof. The flow body 10 can for example be a flap, for example a landing flap, as described above. FIG. 11 shows the flow body 10, the aircraft wing 12 and the support means 23 from the side, while FIG. 12 shows the flow body 10, the aircraft wing 12 and the support means 23 from the rear or from the front.

The upper end of the support means 23 is fixed for example at two positions on the flow body 10. In this case, the support means 23 forms the two bearing points A* and D as fixing points on the flow body 10, as also shown previously in FIG. 11. As shown in FIG. 12, the support means 23 can be attached to the aircraft wing 12 and the flow body 10 at a predetermined angle or for example can also be fixed to the aircraft wing 12 and the flow body 10 at an angle of 90° or in a perpendicular or substantially perpendicular manner (not shown).

Figure 14:
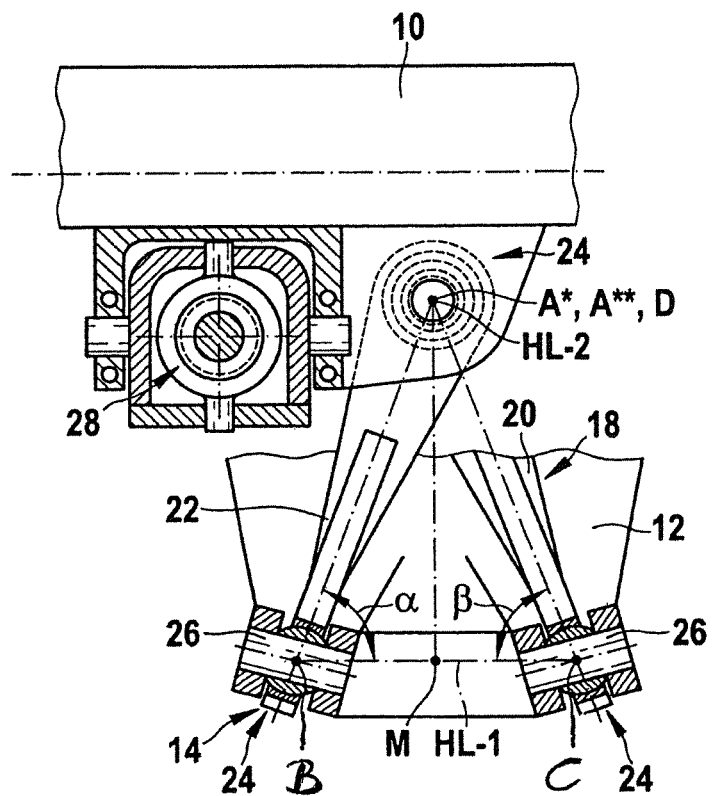
FIG. 14 is a sectional view B-B through the flow body in the upper fixing portion with its support means and its flow body control means according to FIG. 11.

The lower end of the support means 23 is further fixed to the aircraft wing 12 in the bearing point C. The support means can rotate once about the bearing point C and can also move axially or laterally, as indicated by the arrow in FIG. 12. The bearing point C comprises for example a spherical bearing which is fixed with a bolt element 26. FIG. 12 and FIG. 14 which follows show the bearing points A*, A**, B, C and D in a highly simplified and purely schematic manner. Furthermore, the flow body 10 in FIG. 12 is moved via at least one or more drive means 28. The drive means and the positioning thereof on the aircraft wing 12 are shown purely by way of example and in a highly simplified manner. The invention is not limited to this drive means and the positioning thereof.

Figure 13:
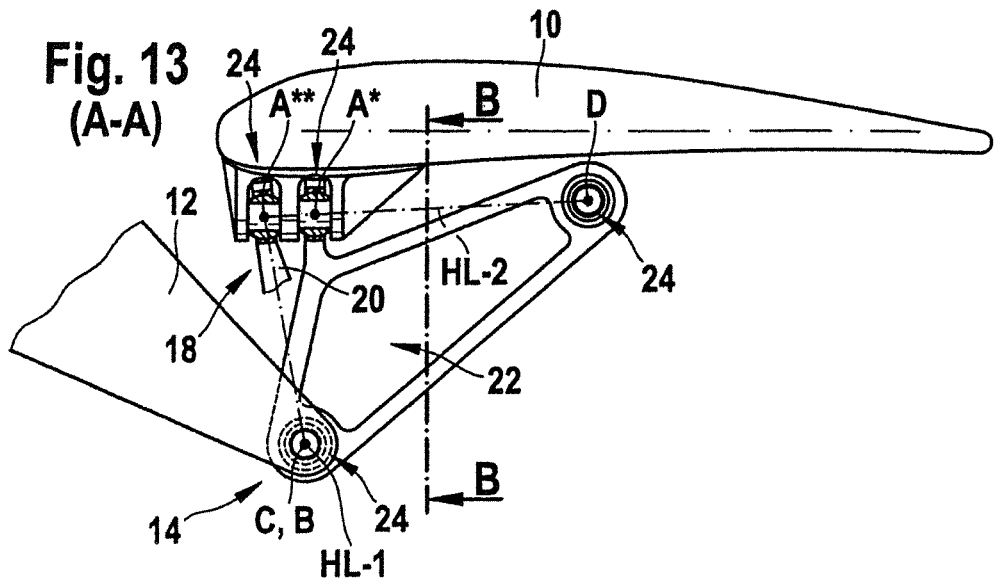
FIG. 13 is a sectional view A-A through the flow body in the upper fixing portion according to FIG. 2, with the support means thereof and a flow body control means.

FIG. 13 is a sectional view A-A at the first fixing portion 14 through the moveable flow body 10 of the invention according to FIG. 2 and the support means 22 and flow body control means 18 thereof. In the case of this flow body 10, the upper, first end of the control rod element 20 is fixed or mounted at a first point A** of the flow body 10. The upper, first end of the support means 22 is further fixed or mounted at a second point A* on the flow body 10. As shown in the example of FIG. 13, the two upper bearing points A** and A* of the control rod element 20 and of the support means 22 can be located on a common axis HL-2 formed by the points A* and D of the support means 22. However, this is not absolutely necessary. The bearing point A** of the control rod element 20 can also be arranged in another position outside the axis HL-2.

The lower, second end of the control rod element 20 is further fixed or mounted at a first point C of the aircraft wing 12. The lower, second end of the support means 22 is also fixed or mounted at a second point B on the aircraft wing 12. The two lower bearing points C and B of the control rod element 20 and of the support means 22 form a common axis HL-1, about which the flow body control means 18 can rotate or pivot. The control rod element 20 further ensures that the flow body 10 is guided in a predetermined plane about the axis HL-1. The plane about which the flow body 10 is guided is determined by the vertical to the axis HL-1 in the example in FIG. 10.

In this example, as shown in FIG. 13, the support means 22 is for example in the shape of a bow, the support means 22 being fixed for example at two points on the flow body 10 and in this case forming the bearing points A* and D. The support means 22 is further fixed at a point on the aircraft wing 12, where it forms the bearing point B. The support means 22 has the advantage that, owing to the bow shape and the two fixing points or bearing points A* and D on the flow body 10, the stability can be increased further.

The flow body control means 18 is further provided, for example in the form of a control rod element 20. The upper end of the control rod element 20 is fixed at a point on the flow body 10 and in this case forms the bearing point A**. The two bearing points A* and D of the support means 22 and the bearing point A** of the control rod element 20 are preferably located on a common axis HL-2 which, as described above, is formed by the bearing points A* and D of the support means 20. However, the bearing point A** of the control rod element 20 can also be arranged in another position outside the axis HL-2.

The lower end of the control rod element 20 is further fixed to the aircraft wing 12 and in this case forms the bearing point C. The bearing points B and C with which the support means 22 and the control rod element 20 are fixed to the aircraft wing 12 form a common axis HL-1, about which the flow body control means 18 is rotated. The flow body 10 is guided in a predetermined plane perpendicular to the axis HL-1 by the provision of the flow body control means 18 and the control rod element 20 thereof. The control rod element 20 prevents an undesirable lateral or axial movement of the flow body 10. As a result, spherical bearings 24 can be provided in each case for the bearing points A*, A**, B, C and/or D. The bearing points can optimally be pinned via corresponding bolt elements 26, in such a way that spherical bearings 24 of this type can be provided. However, any other suitable mounting or any other suitable bearing can also be provided. The invention is not limited to a spherical mounting or a spherical bearing 24.

FIG. 14 further shows a sectional view B-B at the first fixing portion 14 through the movable flow body 10 according to the invention in FIG. 13 and the support means 22 and flow body control means 20 thereof.

As described above, the flow body 10 can for example be a flap, for example a landing flap. While the flow body 10 and the aircraft wing 12 are shown in a lateral sectional view in FIG. 13, FIG. 14 shows the flow body 10 and the aircraft wing 12 from the front. In this case, FIG. 14 shows the bearing point B at which the lower end of the support means 22 is fixed to the aircraft wing 12. The upper end of the support means 22 is further fixed for example at two positions or two points A* and D on the flow body 10. The support means 22 forms the two bearing points A* and D as fixing points on the flow body 10. As shown in FIG. 14, the support means 22 can be attached to the aircraft wing 12 and the flow body 10 at a predetermined angle α to an axis HL-1 or else can be attached to the aircraft wing 12 and the flow body 10 for example at an angle of 90° or perpendicular or substantially perpendicular (not shown) to the axis HL-1. The axis HL-1 is formed by the point B at which the support means 22 is fixed to the wing 12 and by the point C at which the flow body control means 18 or the control rod element 20 is fixed to the wing 12.

The flow body control means 18 and the control rod element 20 thereof are further positioned relative to the support means 22 in such a way that the flow body 10 is guided in a predetermined plane and an undesirable lateral or axial movement of the flow body 10 is also prevented. For this purpose, the flow body control means 18 and the control rod element 20 thereof are arranged at a corresponding angle β to the support means 22 and the axis HL-1 or are positioned in such a way that the flow body control means 18 supports the support means 22 laterally and axially. In other words, the flow body control means 18 and the support means 22 are arranged in different planes and not in the same plane.

The flow body control means 18 or the control rod element 20 thereof is fixed at the lower end thereof to the aircraft wing 12 and forms the above-mentioned bearing point C. The upper end of the control rod element 20 is fixed to the flow body 10 in the bearing point A**. The two bearing points B and C, in which the support means 22 and the control rod element 20 are fixed to the aircraft wing 12, form the above-mentioned axis HL-1, about which the flow body control means 18 is rotated. The bearing points A* and C in which the support means 22 is fixed to the flow body 10 form the axis HL-2, the bearing point A** in which the control rod element 20 is fixed to the flow body 10 being located in the axis HL-2, although this is not absolutely necessary. The flow body 18 is guided by the control rod element 20 in a plane about the axis HL-1. The plane intersects the axis HL-1 in the virtual point of rotation M on the axis HL-1.

FIG. 14 further shows by way of example a drive means 28 for actuating or pivoting the flow body 10 by means of the support means 22. However, this drive means 28 is merely exemplary and the invention is not limited to this specific configuration and the arrangement or positioning thereof.

As described above with reference to FIGS. 13 and 14, the flow body 10 is, as shown previously in FIG. 2, connected to the aircraft wing 12 at least two fixing portions 14, 16 or movable support means (movable flap supports). The flow body 10 forms the bearing points B and C on a first fixing portion 14 via the support means 22 and the control rod element 20.

The flow body 10 is guided in a predetermined plane in a point about the axis HL-1, which is formed by the points or fixing or bearing points B and C of the support means 22 and the control rod element 20. As a whole, the flow body 10 is rotated about a virtual axis, the point of the flow body 10 being guided in the predetermined plane about the axis HL-1.

In other words, the bearing points B and C on the fixing portion 14 (movable flap supports) guide the flow body 10 via the virtual axis of rotation (hinge line), the axial direction initially being free, as explained above with reference to FIG. 2. The axial direction is subsequently limited by fixing the control rod element 20 on the flow body 10. The moment about the virtual axis of rotation is transferred or applied by one or more drive means 28, as shown by way of example in FIG. 14. The drive means 28 can for example comprise at least one or more spindle drives or rotary drives or linear drives, to mention just three examples. The invention is not limited to this embodiment of the drive means 28.

The axial movement and also the axial load or the lateral movement and the lateral load are absorbed by the flow body control means 18 and the control rod element 20 thereof. As a result, a movement of the flow body 10 for example in the flight direction (streamwise motion) can be achieved.

Although the present invention has presently been described on the basis of preferred embodiments, it is not restricted thereto, but can be modified in many different ways.

Thus, the flow body control means 18 can be formed in addition to a control rod element 20 for example also in the form of a bow (not shown), like the support means 22, and fixed at one or two points or bearing points on the flow body 10. The bearing points of the flow body control means and the bearing points of the support means on the flow body can be located for example on the axis HL-2. However, this is not essential. Furthermore, the support means can be constructed, instead of as a plate or a frame, in a one-part bow shape or a triangular shape or else as rod elements, a rod element providing the connection of the bearing points B and A* and optionally a further rod element additionally providing the connection of the bearing points B and D. An additional rod element can optionally also be provided for the connection of the bearing points A* and D.

LIST OF REFERENCE NUMERALS 10 movable flow body
11 further landing flap (adjacent to flow body or landing flap)
12 aircraft wing
13 attachment
14 first fixing portion
16 second fixing portion
18 flow body control means
20 control rod element
22 support means (first fixing portion)
23 support means (second fixing portion)
24 spherical bearing
26 bolt element
28 drive means

The invention claimed is:

1. A wing of an aircraft or spacecraft, the wing comprising:
at least a movable flow body, wherein:
the wing comprises a movable support member, which is connected to the flow body, for rotating the flow body on the wing, wherein the support member is connected to the flow body and the wing,
the wing comprising a flow body control element, wherein the flow body control element is connected to the flow body and the wing,
the flow body control element being connected to the wing in a first point and the support member being connected to the wing in a second point, which is a bearing point defined on both the support member and the wing,
the two points of the flow body control element and of the support member forming an axis,
the flow body control element being formed at a predetermined angle to the axis and
wherein the flow body control element guides the flow body in a predetermined plane about the axis, wherein at least one point of the flow body control element at which said flow body control element is connected to the flow body and a point of the support member at which said support member is connected to the flow body each form a separate connected point or a common connection on the flow body.

2. The wing according to claim 1, wherein the support member is fixed to the flow body in at least one point.

3. The wing according to claim 1, wherein the support member is fixed to the flow body in at least two points.

4. The wing according to claim 1, wherein the flow body control element is fixed to the flow body in at least one point.

5. The wing according to claim 1, wherein the flow body control element is positioned relative to the support member in such a way that said flow body control element absorbs forces of the support member in a predetermined direction, the flow body control element absorbing lateral and axial forces of the support member.

6. The wing according to claim 1, wherein the support member is formed as a frame element.

7. The wing according to claim 1, wherein the support member is formed as a plate.

8. The wing according to claim 1, wherein the support member is formed as one or more rod elements.

9. The wing according to claim 1, wherein the support member has a bow shape.

10. The wing according to claim 1, wherein the support member has a triangular shape.

11. The wing according to claim 1, wherein the wing comprises at least two fixing portions, each fixing portion comprising a support member and a fixing portion additionally being provided with the flow body control element.

12. The wing according to claim 2, wherein at least one of the points of the support member fixed to the flow body and the wing is formed as a spherical bearing.

13. The wing according to claim 3, wherein a plurality of the points of the support member fixed to the flow body and the wing are formed as a spherical bearing.

14. The wing according to claim 3, wherein all of the points of the support member fixed to the flow body and the wing are formed as a spherical bearing.

15. The wing according to claim 4, wherein one of the points of the control element fixed to the flow body and the wing is formed as a spherical bearing.

16. The wing according to claim 4, wherein a plurality of the points of the control element fixed to the flow body and the wing are formed as a spherical bearing.

17. The wing according to claim 4, wherein all of the points of the control element fixed to the flow body and the wing are formed as a spherical bearing.

18. The wing according to claim 1, wherein the flow body control element comprises at least a control rod element.

19. The wing according to claim 1, wherein the flow body is one of a landing flap or a wing element.

20. An aircraft comprising at least a wing comprising:
at least a movable flow body, wherein:
the wing comprises a movable support member, which is connected to the flow body, for rotating the flow body on the wing, wherein the support member is connected to the flow body and the wing,
the wing comprising a flow body control element, wherein the flow body control element is connected to the flow body and the wing,
the flow body control element being connected to the wing in a first point and the support member being connected to the wing in a second point, which is a bearing point defined on both the support member and the wing,
the two points of the flow body control element and of the support member forming an axis,
the flow body control element being formed at a predetermined angle to the axis and
wherein the flow body control element guides the flow body in a predetermined plane about the axis, wherein at least one point of the flow body control element at which said flow body control element is connected to the flow body and a point of the support member at which said support member is connected to the flow body each form a separate connected point or a common connection on the flow body.

* * * * *